(12) United States Patent
Kook

(10) Patent No.: US 7,936,147 B2
(45) Date of Patent: May 3, 2011

(54) NON-CONTACT CHARGER CAPABLE OF WIRELESS DATA AND POWER TRANSMISSION AND RELATED BATTERY PACK AND MOBILE DEVICE

(75) Inventor: Yoon-Sang Kook, Gwacheon-si (KR)

(73) Assignee: Hanrim Postech Co., Ltd., Suwon-si (KR)

( * ) Notice: Subject to any disclaimer, the term of this patent is extended or adjusted under 35 U.S.C. 154(b) by 0 days.

(21) Appl. No.: 12/843,820

(22) Filed: Jul. 26, 2010

(65) Prior Publication Data

US 2010/0289450 A1    Nov. 18, 2010

Related U.S. Application Data

(63) Continuation of application No. 11/817,929, filed on Sep. 6, 2007, now Pat. No. 7,791,312.

(30) Foreign Application Priority Data

Oct. 24, 2006   (KR) .................. 10-2006-0103254

(51) Int. Cl.
*H01M 10/46* (2006.01)
(52) U.S. Cl. ......................................... 320/108
(58) Field of Classification Search ............ 320/106, 320/107, 108, 112, 114, 115, 157, 158, 162, 320/163; 455/73
See application file for complete search history.

(56) References Cited

U.S. PATENT DOCUMENTS

| 5,455,466 A | * | 10/1995 | Parks et al. .................. 307/104 |
| 2003/0103039 A1 | | 6/2003 | Burr et al. |
| 2006/0199146 A1 | | 9/2006 | Mandelkern et al. |
| 2007/0032274 A1 | | 2/2007 | Lee et al. |
| 2007/0072474 A1 | | 3/2007 | Beasley et al. |

FOREIGN PATENT DOCUMENTS

| JP | 11-168837 | 6/1999 |
| KR | 10-2004-0028312 | 4/2004 |
| KR | 10-2006-0005537 | 1/2006 |
| KR | 10-2006-0031526 | 4/2006 |

* cited by examiner

*Primary Examiner* — Edward Tso
(74) *Attorney, Agent, or Firm* — Echelon Law Group, PC

(57) ABSTRACT

Disclosed is a non-contact charger. The present invention provides a non-contact charger capable of wireless data communication and power supply between a non-contact charger capable of computer UBS communication and a charging battery-pack of a mobile device, using an induced electromotive force, thereby to enable data communication and power supply at the same time and to make good signal transmission without other poor contacts in the contact transmission.

42 Claims, 11 Drawing Sheets

US 7,936,147 B2

NON-CONTACT CHARGER CAPABLE OF WIRELESS DATA AND POWER TRANSMISSION AND RELATED BATTERY PACK AND MOBILE DEVICE

This is a continuation of application Ser. No. 11/817,929, filed Sep. 6, 2007, which claims priority under 35 U.S.C. §119(a) to Korean Patent Application No. 10-2006-0103254, filed on Oct. 24, 2006, in the Korean Intellectual Property Office. The contents of all of these priority applications are incorporated herein by reference in their entirety as if set forth in full.

TECHNICAL FIELD

The present invention relates to a non-contact charger, and more particularly to a non-contact charger capable of wireless data communication and power supply between a non-contact charger capable of computer UBS communication and a charging battery-pack of a mobile device, using an induced electromotive force, thereby to enable data communication and power supply at the same time and to make good signal transmission without other poor contacts in the contact transmission.

BACKGROUND ART

Generally, mobile devices are apparatuses that users easily hold and use while moving along, and includes mobile phones, PDA, MP3 players, etc.

These mobile devices are configured so that they can be used for a certain period by mounting a charged battery in a mobile device or charging a battery installed inside the mobile device. Therefore, the mobile devices provide conveniences to allow them to receive required data from a desk-top computer or a notebook computer and operate desired functions by re-charging their batteries, if necessary.

In Korean Patent Publication No. 10-2001-0026976 (charging equipment for hand phone), a charger for mobile phones used for these mobile devices is configured so that an externally supplied power line can be provided in one side of a body 600, a lower portion of a mobile phone 610 is inserted into an upper mounting space 601 of the body 600, and an internal device 602 in the upper mounting space 601 of the body 600 can come in contact with a power device in a rear lower portion of the mobile phone 610 to supply a power source to the mobile phone 610, as shown in FIG. 11.

These conventional power supply devices have disadvantages that they should be connected to a computer using a separate data cable since they function to supply a power source but not to transmit or process data. The power supply devices also problems that repeated contacts between a contact device of a body with a contact device of a mobile phone cause the sudden change in voltage between them since they are operated in a contact mode, which leads to poor electrical contact between the contact devices and low stability of the power supply devices. In particular, they are problematic in that a lot of moisture and dusts further aggravate the electrical contact, which leads to the mishaps to the mobile phone and the power supply devices.

DISCLOSURE

Technical Problem

Accordingly, the present invention is designed to solve the problems of the prior art, and therefore it is an object of the present invention to provide a non-contact charger capable of wireless data communication and power transmission and a mobile device using the same, wherein the non-contact charger enables wireless data communications and wireless charging between mobile devices (mobile phones, PDA, MP3 players, DAB or DMB devices, PMP, or Handheld devices, etc) and a personal computer (PC) through the non-contact power transmission using an induced electromotive force in which an output power of a USB port is used as an input device in TC, TA or PC.

Also, it is an object of the present invention to provide a non-contact charger capable of wireless data communication and power transmission and a mobile device using the same, wherein the non-contact charger has a foreign substance detection function to detect and remove foreign metal substance rather than a battery pack (a pack having a secondary-side wireless charger module installed inside) of a mobile device to be charged when the foreign metal substance are placed on the mobile device; an identification function to sense the battery pack of the mobile device and sense a charging level of the battery pack; and overload and temperature protection functions.

In order to accomplish the above object, one embodiment of the present invention provides a non-contact charger capable of wireless data communication and power transmission including a USB connector 10 provided in one side of an enclosed device body 2 to attachably/detachably couple with a USB port of a computer or a notebook computer using a jack; a USB driver block 20 coupled to the USB connector 10 and emulated with a USB protocol to receive and transmit data from/to the computer or the notebook computer; an MPU block 30 coupled to the USB connector 10 to control a serial resonator converter 50, a current sensing block 60 and a power supply member, each for receiving a power source from the computer or the notebook computer and supplying the received power source to a mobile device, or receiving and transmitting data from/to the computer or the notebook computer; and a primary coil 70 formed on the device body 2 to generate an induced electromotive force so as to wirelessly transmit a data signal and a power signal from the serial resonator converter 50 to the mobile device, wherein the serial resonator converter 50 converts the data signal received/transmitted between the USB driver block 20 and the mobile device and the power signal supplied from the USB connector 10 to the mobile device, and sums up the converted data and power signals, and the current sensing block 60 analyze a signal of the secondary coil 80 to recognize the mobile device, monitors the primary coil 70 and the secondary coil 80 to control a charge voltage to a stable voltage, and transmits a signal of the MPU block 30, the signal of the secondary coil 80 being transmitted from the primary coil 70 that senses a load regulation signal by means of the secondary coil 80 corresponding to the primary coil 70 and arranged in the mobile device.

Accordingly, the primary coil 70 may be composed of any one of FPCB, PCB, coil and ferrite core in a detachable transformer and formed in a circular, tetragonal or polygonal shape, and the serial resonator converter 50 may be a LLC full-bridge serial resonator converter which is a serial & parallel resonator converter in half wave type or full wave type, and the non-contact charger capable of wireless data communication and power transmission according to the present invention may further include a gate drive block 40 provided between the USB driver block 20 and the serial resonator converter 50, and the MPU block 30 and the serial resonator converter 50 and having a bootstrap gate driver; and a display unit 3 for receiving a signal from the primary coil 70 to display a charging level of a rechargeable battery 230 through the control of the MPU block 30, the primary coil 70 sensing a signal of the charging level of the rechargeable battery 230 from the signal of the secondary coil 80.

Also, the non-contact charger capable of wireless data communication and power transmission according to the present invention may further include a thermal protection safety block 92 for sensing an internal temperature of the device body 2, determining a temperature of the primary coil 70 and transmitting a signal to the MPU block 30 for the purpose of the circuit cutoff; a bimetal 71 coupled in series to the primary coil 70 to intercept a current flow when a current excessively flows in the primary coil 70 or the internal temperature is increased excessively; a dust & smell sensor circuit 90 for sensing dusts and smells inside the device body 2; and an ionizer high voltage drive circuit control block 91 for generating anions and spraying an antimicrobial spray for the bacterial eradication, the current sensing block 60 further may have a foreign substance detection function that is to give an ID to continuously transmit a data signal and a power signal if constant intervals of a PWM pulse are generated in the primary coil 70 and the detected signal from the secondary coil 80 which is in response of the constant intervals of the PWM pulse is detected as a normal signal, or to sense the detected signal as the foreign substance to suspend the transmission of the data signal and the power signal if there is no response or the detected response signal is not a normal signal, and the USB driver block 20 may further include an IrDA signal converter 21 for converting a data signal into USB protocol and IrDA; an IrDA port 22 for transmitting/receiving the data signal, converted to the IrDA by the IrDA signal converter 21, to/from the mobile device through the control of the MPU block 30; and a mobile device ID detector for sensing and identifying a unique ID of the mobile device.

Also, another embodiment of the present invention provides a charging battery-pack including a charger body 201 capable of being in contact with one side of the charge body 2 of the non-contact charger 1 as defined in any of claims 1 to 6, transmitting/receiving a data signal by means of a magnetic field in no contact with the primary coil 70 and having the secondary coil 80 provided in one side thereof and receiving a power signal; a charger controller 210 coupled to the secondary coil 80 arranged in one inner side of the charger body 201 to process a power signal transmitted from the primary coil 70 and transmit the process power signal to rechargeable battery 230 and to process a data signal transmitted/received to/from the primary coil 70; and a charge management block 220 for transmitting a charging power to the rechargeable battery 230 through the control of the charger controller 210, wherein the charge management block 220 supplies a power source of the rechargeable battery 230 to the mobile device.

Accordingly, the charger controller 210 may includes a unique ID unit for transmitting a unique ID to the non-contact charger 1 through the secondary coil 80 and the primary coil 70 if the initial connection is sensed from the non-contact charger 1; and a charge detector circuit for sensing a charging level of the rechargeable battery 230 to transmit a power source to the non-contact charger 1, and the charger body 201 may be composed of separated packs formed separately to attachably/detachably couple with the mobile device, or composed of integrated packs formed integrally to be arranged inside a body case of the mobile device, and the secondary coil 80 may be composed of any one of FPCB, PCB, coil and ferrite core of a detachable transformer, and formed in a circular, tetragonal or polygonal shape.

In addition, the charger body 201 may includes a battery cell 512 for charging a power through a wireless power receiver circuit 513, the power being induced from a secondary coil 516 wound into a charge receiver module 517; shield plates 515, 515-1, 515-2, 515-3, 515-4 surrounding a bottom surface and four front, rear, left and right surfaces of the battery cell 512 and composed of Al, Cu, or Ni alloy metals to protect the battery cell 512 form a magnetic field; a magnetic plate 503 provided between the shield plate 515 and the charge receiver module 517 and composed of ferrites, Mn—Zn (50 parts by weight:50 parts by weight), Ni—Fe (80 parts by weight:20 parts by weight), or fine metals (Fe—Si—Cu—Nb) to easily induce the induced magnetic field into a secondary coil 516; an insulating board 502 composed of meshes and insulators to prevent the heat of the shield plate 515 from being conducted into the battery cell 512, the meshes being made of NI—Cu provided between the shield plate 515 and the battery cell 512 and the insulators being able to release the heat and reduce heat conduction; a shield member 501 surrounding the wireless power receiver circuit 513 and composed of Al, Cu, or Ni alloy metals to shield a magnetic field against the wireless power receiver circuit 513.

And, the mobile device using the non-contact charger according to still another embodiment of the present invention is configured so that it can receive a power source from the non-contact charger 1 as defined in claim 7 and transmit/receive a data.

Also, the mobile device may have a charging battery-pack 200 arranged inside of it and include an IrDA port for communicating a data with an IrDA controller 302 and an IrDA port 22 of the non-contact charger 1, wherein the charging battery-pack 200 comprises the charger body 201 of the integrated pack as defined in claim 9.

In addition, the mobile device may includes a power reception device block 310 electrically contacted with the device block 240 of the charging battery-pack 200 as defined in claim 8 to receive a power source; a DC/DC converter 320 coupled to the power reception device block 310 to convert an electric power; and a charge block 330 for charging the electric power converted in the DC/DC converter 320.

Advantageous Effects

As described above, the non-contact charger capable of wireless data communication and power transmission according to the present invention, and the mobile device using the same may be useful to supply an electric power while stably transmitting/receiving a data without any of errors in the transmission since the wireless data communication and the wireless charging between mobile devices (mobile phones, PDA, MP3 players, DAB or DMB devices, portable music players (PMPs), handheld devices, etc.) and personal computers (PCs) may be performed at the same time through the non-contact power transmission using an induced electromotive force in which an output power of a USB port is used as an input device in TC, TA or PC.

Also, the non-contact charger according to the present invention may be useful to prevent the damage of the mobile devices and maintain the optimum charging efficiency of the battery pack since the non-contact charger has a foreign substance detection function to detect and remove foreign metal substance rather than a battery pack (a pack having a secondary-side wireless charger module installed inside) of a mobile device to be charged when the foreign metal substance are placed on the mobile device; an identification function to recognize the battery pack of the mobile device and recognize a charging level of the battery pack; and overload and temperature protection functions.

DESCRIPTION OF DRAWINGS

These and other features, aspects, and advantages of preferred embodiments of the present invention will be more fully described in the following detailed description, taken accompanying drawings. In the drawings.

BEST MODE

Figure 1:
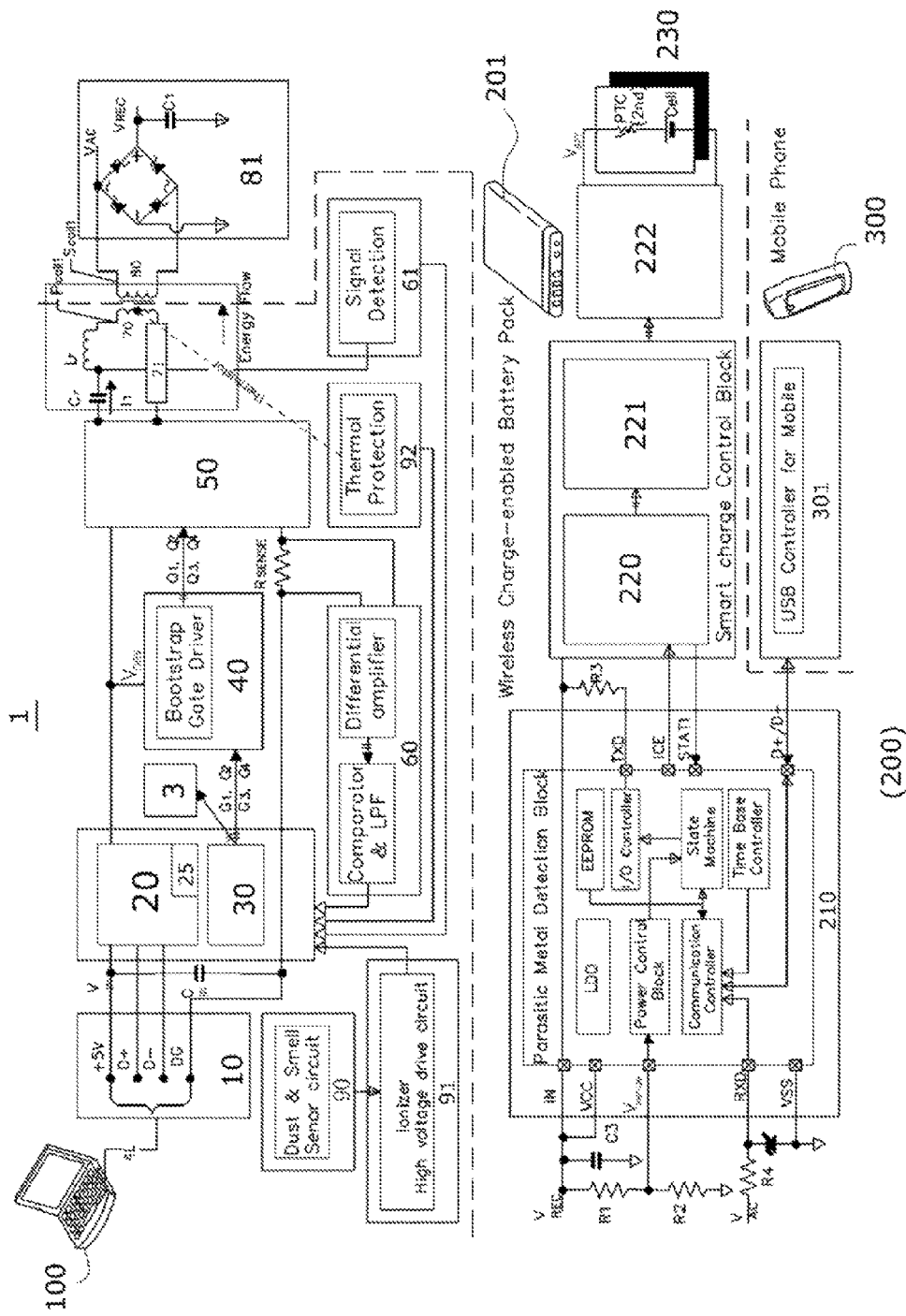
FIG. 1 is a circuit view showing a non-contact charger according to the present invention.

Hereinafter, preferred embodiment of the present invention will be described in detail referring to the accompanying drawings.

That is to say, the non-contact charger 1 according to the present invention includes a USB connector provided in one side of an enclosed device body 2 to attachably/detachably couple with a USB port of a computer or notebook computer 100 using a jack; a USB driver block 20 coupled to the USB connector 10 and emulated with a USB protocol to receive and transmit data from/to the computer or notebook computer 100; an MPU block 30 coupled to the USB connector 10 to control a serial resonator converter 50, a current sensing block 60 and a power supply member, each for receiving a power source from the computer or notebook computer 100 and supplying the received power source to a mobile device 300, or receiving and transmitting data from/to the computer or notebook computer 100; a primary coil 70 formed on the device body 2 to generate an induced electromotive force so as to wirelessly transmit a data signal and a power signal from the serial resonator converter 50 to the mobile device 300; and the like, as shown in FIG. 1 to FIG. 10.

Accordingly, the serial resonator converter 50 is such configured that it can convert the data signal received/transmitted between the USB driver block 20 and the mobile device 300 and the power signal supplied from the USB connector 10 to the mobile device 300, and sum up the converted data and power signals. And, the current sensing block 60 is such configured that it can analyze a signal of the secondary coil 80 to recognize the mobile device 300, monitor the primary coil 70 and the secondary coil 80 to control a charge voltage to a stable voltage, and transmit a signal of the MPU block 30, wherein the signal of the secondary coil 80 is transmitted from the primary coil 70 that senses a load regulation signal by means of the secondary coil 80 corresponding to the primary coil 70 and arranged in the mobile device 300.

And, the primary coil 70 is preferably composed of any one of FPCB, PCB, coil and ferrite core in a detachable transformer. For this purpose, the serial resonator converter 50 may be preferably configured as a resonant converter for conventional transformers, in particular configured for the purpose of the stable power transmission so that it can be configured as a LLC full-bridge serial resonator converter which is a serial & parallel resonator converter in half wave type or full wave type.

Also, the non-contact charger according to the present invention further includes a gate drive block 40 provided between the USB driver block 20 and the serial resonator converter 50, and the MPU block 30 and the serial resonator converter 50 and having a bootstrap gate driver; and a display unit 3 for receiving a signal from the primary coil 70 to display a charging level of a rechargeable battery 230 through the control of the MPU block 30, the primary coil 70 sensing a signal of the charging level of the rechargeable battery 230 from the signal of the secondary coil 80.

Figure 3:
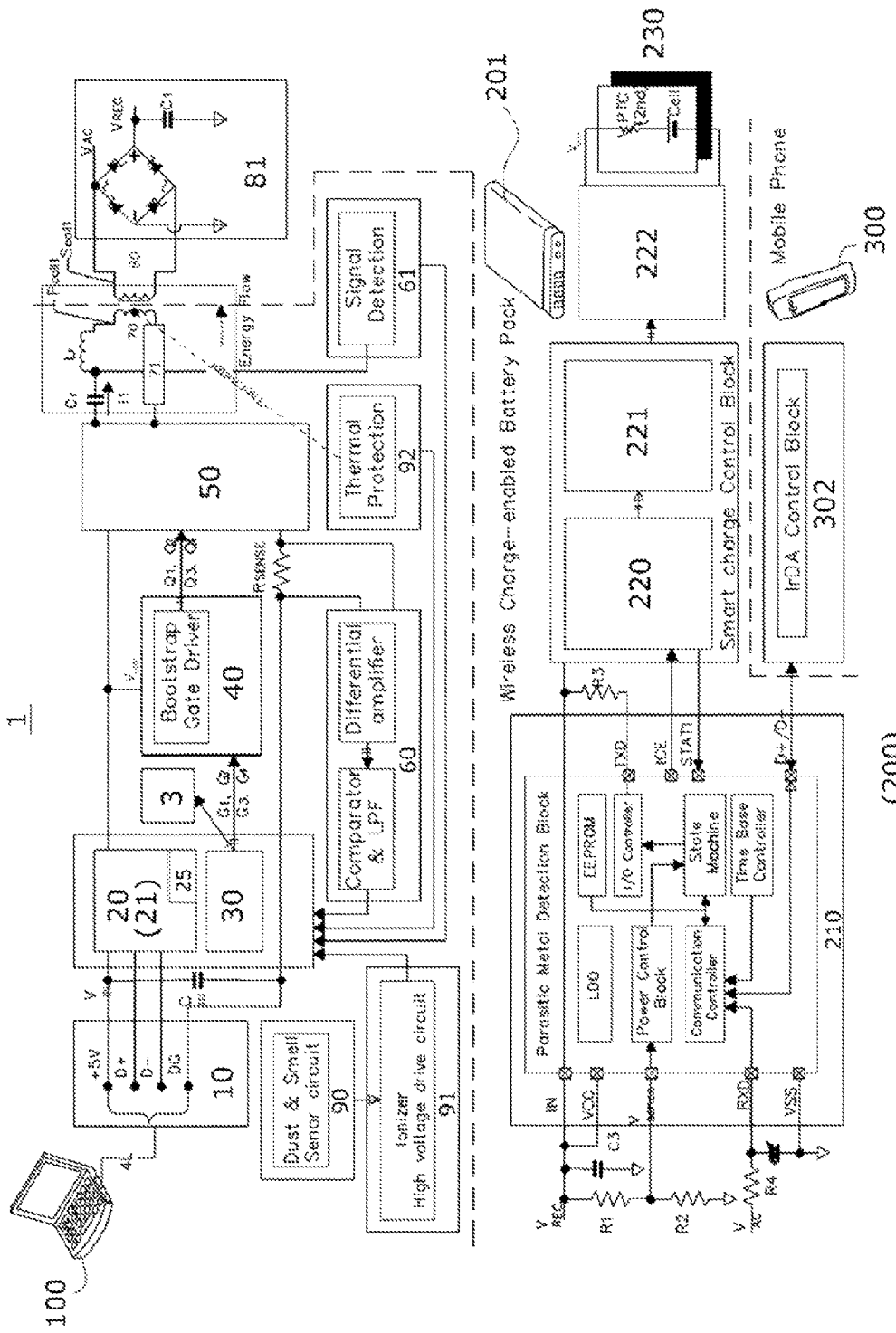
FIG. 3 is a circuit view showing another embodiment to which IrDA communication in the non-contact charger according to the present invention is applicable.
Figure 4:
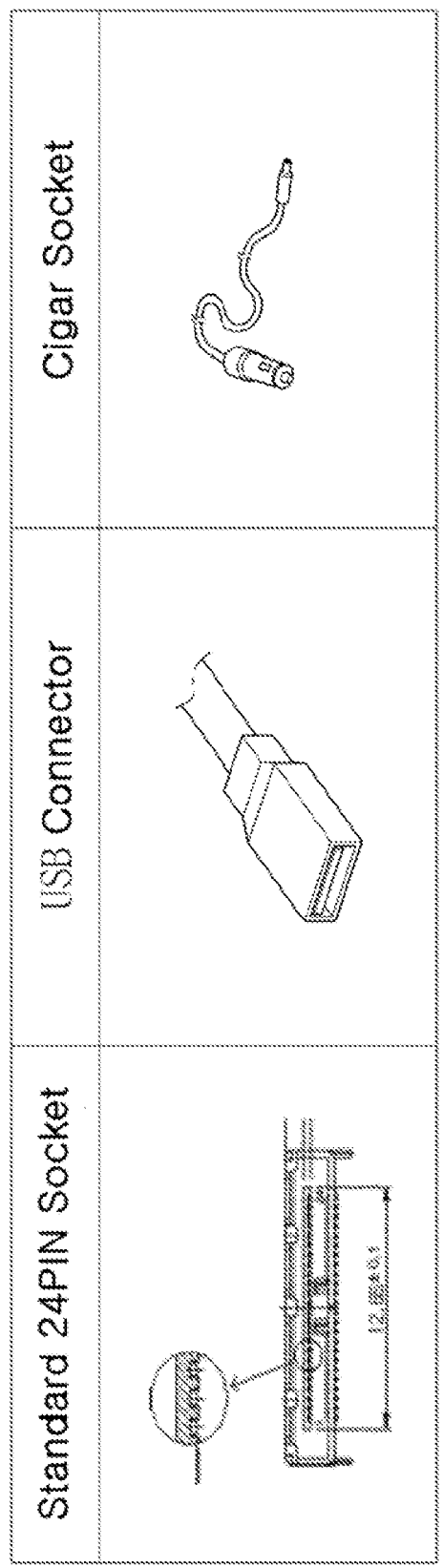
FIG. 4 is an exemplary view showing one embodiment that a charger using a 24-PIN connector, an adapter and a USB port are used as an input device in the non-contact charger according to the present invention.

In addition, the non-contact charger according to the present invention may further include a thermal protection safety block 92 for sensing an internal temperature of the device body 2, determining a temperature of the primary coil 70 and transmitting a signal to the MPU block 30 for the purpose of the circuit cutoff according to the heating in the measured temperature of the primary coil 70 and its high-temperature state; a bimetal 71 coupled in series to the primary coil 70 to intercept a current flow when a current excessively flows in the primary coil 70 or the internal temperature is increased excessively; a dust & smell sensor circuit 90 for sensing dusts and smells inside the device body 2; and an ionizer high voltage drive circuit control block 91 for generating anions and spraying an antimicrobial spray for the bacterial eradication, as shown in FIG. 1 and FIG. 3. Also, the thermal protection safety block 92 with a temperature sensor for the overheat protection, the bimetal 71, the dust & smell sensor circuit 90, the ionizer high voltage drive circuit control block 91, and the like are preferably suitably configured in the charging battery-pack 200 and the mobile device 300 that are coupled to the non-contact charger 1 and operated.

The configuration and operation of the non-contact charger 1 according to the present invention will be described in detail, as follows. That is to say, the non-contact charger 1 according to the present invention is such configured that it can transmit a data between the non-contact charger 1 and the mobile device 300 and transmit a charging power at the same time using a core-to-core communication mode, the mobile device 300 having the charging battery-pack 200 or the charging battery-pack 200 arranged inside of it.

Such a non-contact charger 1 has a communication means for communicating with the computer or notebook computer 100 which can monitor and control states of inner systems of the mobile device 300, the charging battery-pack 200 and the non-contact charger 1. Therefore, as one example, it is shown that the computer or notebook computer 100 and the non-contact charger 1 are communicated to each other by means of the USB communication. This is why the USB communication in addition to the data communication makes it possible to supply the charging power to one line at the same time. However, the data communication between the non-contact charger 1 and the computer or notebook computer 100 is possible in a plurality of data transmission modes such as RS-232c, SISC and serial, parallel transmission modes etc. In this case, the non-contact charger 1 may be supplied with an electric power in conventional separate manners. That is to say, the non-contact charger 1 may be communicated with the computer or notebook computer 100, and simultaneously supplied with a charging power of the mobile device 300 which is one of the peripherals, and also supplied with an electric power in conventional separate manners, which makes it possible to allow the charging and the data communication between the non-contact charger 1 and the mobile device 300 at the same time.

That is to say, the preferred exemplary embodiment of the present invention is a mode of the USB communication between the computer or notebook computer 100 and the non-contact charger 1, and such a USB communication line is ruled so that, among four devices, two devices supply a power source and the other two devices transmit a data. Accordingly, the power source may be supplied to the non-contact charger 1 and the data may be transmitted/received in the USB communication mode. In such a USB communication mode, a host controller is installed inside the computer or notebook computer 100, and therefore the devices connected by means of the lines may be controlled by the host controller. And, a USB driver block 20 of the non-contact charger 1 corresponding to the host controller has a controller for a USB of the non-contact charger 1 installed inside, and the USB driver block 20 converts these information in the USB mode and transmits/receives the converted information to/from the computer or notebook computer 100 according to the conditions of the non-contact charger 1, or if the it is coupled to the charging battery-pack 200 or the mobile device 300 which is coupled to the non-contact charger 1.

Also, communicating in this USB communication mode is transmitting/receiving the modulated information in the primary coil 70 and the secondary coil 80. And, a controller for the USB communication may also be installed inside the charging battery-pack 200, and a controller for the USB communication may also be installed inside the mobile device 300. Therefore, the controllers communicate with the computer or notebook computer 100 in the USB communication using the non-contact charger 1 as a hub since these communication signals are possibly transmitted through the USB driver block 20 of the non-contact charger 1.

Accordingly, the non-contact charger 1 that communicate a data with the mobile device 300 using the core-to-core communication mode and transmits an electric power includes a USB connector 10 for coupling with a USB port of a computer and notebook computer 100; a USB driver block (USB emulation control block) 20 coupled to the computer and notebook computer 100 and the USB connector 10 to receive music, moving pictures, data from the computer or notebook computer 100 and emulate them with a USB protocol; an MPU block 30 for controlling internal elements of the non-contact charger (wireless charger) 1; a gate drive block including a bootstrap gate driver; a serial resonator converter 50 which is an LLC full-bridge serial resonator converter; a primary coil 70 used as a detachable transformer composed of FPCB, PCB, coil and ferrite core and synthesizing a signal through the control of the MPU block 30 and wirelessly transmitting the synthesized signal to the secondary coil 80 of the battery-pack installed inside the mobile device 300; a bimetal 71 coupled in series to a C-L resonator when all functions of the chips are shut down and detachably inserted to ensure its safety when the core (a primary coil 70) are overheated; a dust & smell sensor circuit 90 for sensing dusts and smells on the non-contact charger 1; an ionizer high voltage drive circuit control block 91 for spraying an antimicrobial spray for the partial anion generation or the bacterial eradication; a current sensing block 60 for stably controlling an electric power through a current feedback using an automatic variation algorithm of primary frequency so as to recognize ID of the charging battery-pack 200 in the MPU block 30 of the charging module in the primary coil 70 through the load regulation in the mobile device having a wireless charging module installed inside of it, the wireless charging module being coupled to the secondary coil 80 and arranged in the charging battery-pack 200, and to control a voltage of a secondary rectification terminal in the charging battery-pack 200; a thermal protection safety block 92 for sensing a temperature of the charging chips; and a signal detection block 61 coupled to the primary coil 70 to detect a secondary signal, the primary coil 70 sensing a feedback signal out of the secondary signal in the charging battery-pack 200.

As a result, the mobile device 300 may use the above-mentioned non-contact charger 1 as a hub of the USB communication to receive music, moving pictures, data, etc. from the computer (PC) or notebook computer 100, and further control the mobile device 300 in the computer or notebook computer 100. For this purpose, the USB driver block 20 coupled to the USB connector 10 emulates the transmitted/received data with a USB protocol, and wirelessly transmits a signal to the mobile device 300 or the charging battery-pack 200 by synthesizing a signal in the primary coil (a detachable transformer: a transformer composed of FPCB, PCB, Coil and Ferrite core) 70 through the USB driver block 20 and the MPU block 3 and converting the synthesized signal. Therefore, like the primary coil 70, the USB driver block 20 receives a data signal transmitted from the secondary coil (a detachable transformer: a transformer composed of FPCB, PCB, Coil and Ferrite core) 80 of the charging battery-pack 200 to separate a signal through the frequency shift keying (FSK), and stores the data in a storage medium (memory) of the mobile device 300. Therefore the USB driver block 20 may store data using the USB controller 301 since it includes the USB controller 301.

In addition, if the charging battery-pack 200 or the mobile device 300, each having a secondary wireless charging module installed inside, approaches the non-contact charger 1 when the non-contact charger 1 is still in operation, then they may be automatically synchronized in the computer or notebook computer 100 to be automatically contacted by means of the USB communication, and the storage medium folders are popped up in the mobile device 300 to wirelessly upload and download music (MP3 format), moving pictures (avi, asf, dat format), data, etc. to/from the computer or notebook computer 100.

That is to say, the non-contact charger 1 coupled to the computer or notebook computer 100 senses the contact of the charging battery-pack 200 by allowing the primary coil 70 to transfer a pulse in constant intervals. Then, the wireless data communication possible between the primary coil 70 of the non-contact charger 1 and the secondary coil 80 of the charging battery-pack 200. Separately, the non-contact charger 1 may supply an electric power of the USB port in the computer or notebook computer 100, or separate supply powers to the charging battery-pack 200. The configurations of the non-contact charger 1 and the battery pack 200, and the mobile device and the like will be carried out using a large number of techniques filed by the inventors. In addition to the charging and data communication mode by the above-mentioned non-contact charger 1 and battery pack 200, the non-contact charger 1 and the battery pack 200, and the mobile device and the like are provided in the present invention so that an electric power can be supplied to them and the data can communicate between them, thereby to facilitate the data transmission/reception to/from a controller of a main computer or notebook computer, and the state monitoring, etc.

And, if the current sensing block 60 receives a signal which is proven not to have a memory in which the signal from the secondary coil 80 can receive the mobile device 300 and music (MP3 format), moving pictures (avi, asf, dat formats), data, etc, then the USB driver block (USB emulation control block) 20 further includes a USB data transmission control module 25 not to transmit the USB data (music (MP3 format), moving pictures (avi, asf, dat format), data, etc.) through the control of the MPU block 30, and the mobile device may thus transmit data again if the mobile device is proven to be in contact. Then, the primary coil 70 and the secondary coil 80 transfer only an electric power and a data required for the power transfer, and also transmits suitable signals for them to the computer or notebook computer.

Then, a unique ID is generated in the charging battery-pack 200 or the mobile device 300 in response to the pulse signal of the non-contact charger 1 and transmitted to the non-contact charger 1 via the serial resonator converter 50, the primary coil 70 and the secondary coil 80 through the control of the MPU block 30 of the non-contact charger 1. That is to say, if a unique ID signal is transmitted through the secondary coil 80 from ID chips in the charger controller 210 of the charging battery-pack 200, the ID chips having a secondary wireless charging module installed inside, then the unique ID of the charging battery-pack 200 or the mobile device 300 is recognized by a load regulation signal of the supplied power signal in the primary coil 70, the signal detection block 61, the current sensing block 60. If the unique ID of the charging battery-pack 200 or the mobile device 300 is recognized as described above, then information about the charging battery-pack 200 or the mobile device 300 is transmitted to the computer or notebook computer 100. That is to say, if the non-contact charging battery-pack 200 is put on the non-contact charger 1, the ID chips installed inside the charging battery-pack 200 operate and regulate a load under a non-load state to transmit a charge start ID to the non-contact charger 1, and the non-contact charger 1 feedbacks the signal to confirm that the ID accords as a right signal, and supplies an electric power to the charging battery-pack 200 in a full power mode if the ID accords as a right signal.

And, if the unique ID of the charging battery-pack 200 or the mobile device 300 is recognized, then a voltage of the secondary rectification terminal in the charging battery-pack 200 or the mobile device 300 is controlled to a constant voltage by means of the primary coil 70 and the secondary coil 80. This may control the secondary charging power of the charging battery-pack 200 or the mobile device 300 using an automatic variation algorithm of primary frequency of the non-contact charger 1, minimize a consumed power [Pdis= (Vout−Vbat)*Ichg] by Vdrop in the primary coil 70, the signal detection block 61 and the current sensing block 60 of the non-contact charger 1 to reduce separate elements of the secondary charging module in the charging battery-pack 200 or the mobile device 300, and prevent the increase in temperature of other charging chips. Therefore, it is possible to use linear charging IC without the use of the complex and expensive switching charging IC, and to ensure an inner space of the battery-pack.

Next, different kinds of metal bodies without any of charging modules are heated by the heat which is generated due to the loss by an eddy current by an induced electromotive force when the metal bodies are put on the non-contact charger 1, which leads to the damage in the non-contact charger 1. This phenomenon is one of the problems that have the most serious effect on the stability of the non-contact charger 1 using the induced electromotive force. Therefore, the mobile devices should have a safety device to recognize different kinds of metal bodies, such as coins, metal pens, scissors, etc., without any of charging modules and to shut down an electric power to prevent their overheat.

As configured above, a means for transmitting an electric power from the primary coil 70 to the secondary coil 80 is to use a half wave or full wave type serial & parallel resonator converter to induce LC resonance, thereby to make an electric current into a sine wave and transmit an electric power to the secondary side by means of the inductive coupling. At this time, the switching frequency is set to a higher level than the resonant frequency to be soft-switched. There is a mechanism for sensing and determining whether different kinds of foreign substance is put on the non-contact charger 1 by applying a PWM pulse at constant intervals in the primary coil 70 for a very short time. The switching frequency and the phase of current is always formed at an angle of 90 degree under an unloading condition. At this time, the phase of current is changed with the change in self inductance if foreign substance approaches the primary coil 70, and a level of the foreign substance is recognized according to the level of phase difference. That is to say, if an approaching matter is sensed, an ID check signal is transferred during a constant period that an electric power is applied. At this time, the approaching matter is recognized as foreign substance if a feedback unique ID signal is not sensed or different ID is sensed, and then a charging system of the non-contact charger 1 is shut down not to supply a charging power to the primary coil 70, thereby to ensure the stability of the charge management block in the charging battery-pack 200 or the mobile device 300.

That is to say, the current sensing block 60 of the non-contact charger 1 generates constant intervals of a PWM pulse in the primary coil 70, and then the current sensing block 60 further has a foreign substance detection function that is to give an ID to continuously transmit a data signal and a power signal if constant intervals of a PWM pulse are generated in the primary coil 70 and the detected signal from the secondary coil 80 which is in response of the constant intervals of the PWM pulse is detected as a normal signal, and to sense the detected signal as the foreign substance to suspend the transmission of the data signal and the power signal if there is no response or the detected response signal is not a normal signal.

Also, complicated techniques are required for this foreign substance detection function to sense the foreign substance during the charging, wherein an electric power gradually falls down with the charging. Hysteresis is put on this power curve, and a matter is recognized as foreign substance if a signal of the matter goes beyond a hysteresis period when the matter is put on the current sensing block 60, thereby to use an algorithm to shut down the current sensing block 60.

The present invention may provide a wireless charging solution with the safety and the battery monitoring function of the charging battery-pack 200 in the non-contact charger 1, wherein a safety device and wireless charging modules are installed inside the charging battery-pack 200.

In addition, the non-contact charger 1 basically detect temperature of the primary coil 70 and various component chips using the thermal protection safety block 92, or monitors inner temperature of the device body 2 to prevent an overcurrent flow since the non-contact charger has chips having a shut-down function at a constant temperature over 45° C. and a protection function against the overcurrent and overvoltage, and also prevent an overcurrent flow since the non-contact charger 1 has a fuse installed inside. And, a circuit is intercepted if the functions of the component chips in the non-contact charger 1 is paralyzed and erroneous signals are detected, and then the non-contact charger 1 organizes safety devices, for example to intercept a circuit when the primary coil 70 is overheated, by forming bimetals 71 in series in a C-L resonator coupled to the primary coil 70.

And, the non-contact charger 1 additionally functions to spray an antimicrobial spray for the anion generation or the bacterial eradication, and display a charging level of the LCD display unit 3 or the computer and notebook computer 100, etc. In addition, if the rechargeable battery 230 is fully charged, then the rechargeable battery 230 receives a full charging signal, outputted from the charging IC, from ID chips and transmits the full charging state to the non-contact charger 1 through the control of the charger controller 210 by means of the load regulation, and then feedback this signal to display in a display unit 3, the computer or notebook computer 100 and the like that the charging battery-pack 200 is completely charged.

This non-contact charger 1 of the present invention may be charged with an electric power from the computer or notebook computer 100 using a USB port as described above and shown in FIG. 4, and also additionally configured to be charged in other manners under the circumstances that it is not connected with the computer or notebook computer, that is, that users are on their travels. That is to say, a 24-PIN connector using a charger, an adapter, a USB port, and the like may as an input device may be employed. As one example, if a portable charger is connected using a 24-PIN standard connector, then the portable charger is always supplied with a voltage of 4.2 V through pins 21 and 22 by means of certain ID resistance assigned to a pin 1, and if an adapter is connected, then the adapter may be supplied with an electric power through pins 4 and 5, and if a USB port is connected, then the USB port may be supplied with an electric power through a pin 16, and therefore the non-contact charger 1 may operate at an input power of 4 to 5.5 V.

And, the adapter using the 24-PIN standard connector may be used to charge two mobile devices at the same time by constituting a docking station to connect two non-contact chargers to each other, wherein the docking station may charge two mobile devices at the same time.

The non-contact charger 1 of another embodiment of the present invention as configured thus will be described in detail, as follows.

That is to say, the USB driver block 20 that communicate with the computer or notebook computer 100 using a USB port additionally has a function as a controller for the USB, as well as a function to convert a data signal into an IrDA signal.

Accordingly, this USB driver block 20 further includes an IrDA signal converter 21 for converting a data signal into a USB protocol and an IrDA, and also it further includes an IrDA port 22 for transmitting/receiving a data signal to/from the mobile device 300 through the control of the MPU block 30, wherein the data signal is converted into IrDA by the IrDA signal converter 21. Also, it further includes a mobile device ID detector (not shown) for sensing and identifying a unique ID of the mobile device 300 that is transmitted from the IrDA controller block 302 of the mobile device 300 and received in the IrDA port 22.

Figure 2:
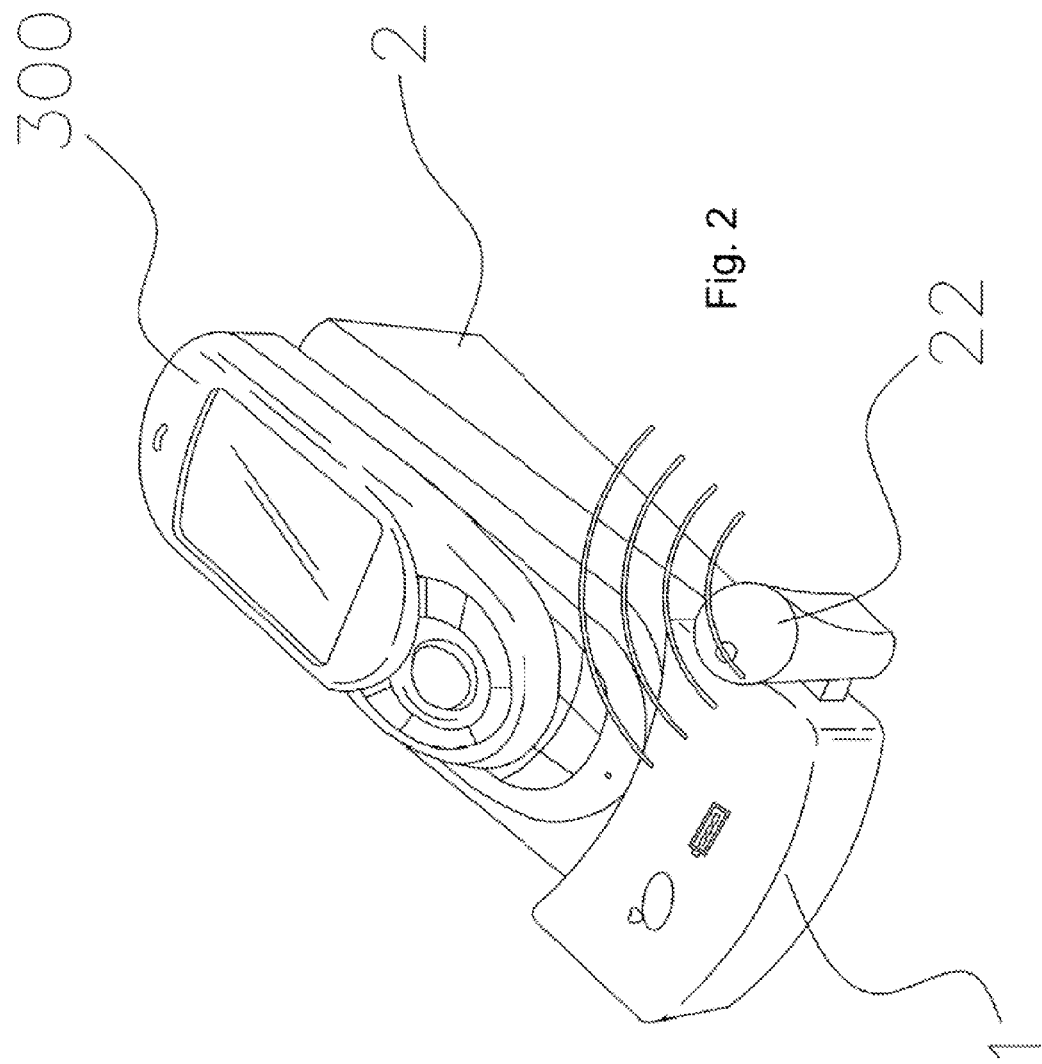
FIG. 2 is a perspective view showing one embodiment to which IrDA communication in the non-contact charger according to the present invention is applicable.

Accordingly, FIG. 2 and FIG. 3 are diagrams showing a non-contact charger 1 having an IrDA transceiver module installed inside according to the present invention.

Referring to FIG. 2 and FIG. 3, if the non-contact charger 1 is connected to a USB port of the computer or notebook computer 100 for the power input, the non-contact charger 1 converts data, such as USB communication protocol and IrDA, to each other using an IrDA signal converter 21 installed inside the non-contact charger 1, and engages music, moving pictures, data and the like, which are stored from the PC or notebook computer, through an IrDA transceiver to wirelessly exchange the data with the mobile device 300 (mobile phones, PDA, PMP, DMB devices, MP3, etc.). Of course, a battery is charged with an electric power for power supply by transmitting energy to the mobile device 300 by means of the primary coil 70 and the secondary coil 80 by employing a non-contact detachable transformer.

If the IrDA port 22 installed inside the non-contact charger 1 and the IrDA port of the mobile device 300 are matched with each other to allow the mobile device 300, with a secondary wireless charging module installed inside, to approach the non-contact charger 1, then the non-contact charger 1 automatically synchronizes with a computer body by means of the primary coil 70 and the secondary coil 80, as described above. As a result, USB is automatically connected to the computer or notebook computer 100 so that interactive infrared data communication can be made between the non-contact charger 1 and the mobile device 300, and therefore a storage medium folder of the mobile device 300 may be popped up, the data such as music (MP3 format), moving pictures (avi, asf, dat format), and the like may be down-loaded, and other data may be processed at the same time.

Accordingly, FIG. 3 shows an infrared data communication system using an IrDA port installed inside between the non-contact charger 1 and the mobile device 300, and a configuration of the non-contact charger 1 for transmitting an electric power.

That is to say, the non-contact charger 1 as shown in FIG. 3 includes a USB connector 10; a USB driver block 20 having an IrDA signal converter 21 for converting a signal into a USB-to-IrDA; an MPU block 30; a gate drive block 40 including a bootstrap gate driver; a serial resonator converter 50 of an LLC full-bridge serial resonator converter; a primary coil 70; a secondary coil 80; a bimetal 71; an dust & smell sensor circuit 90; an ionizer high voltage drive circuit control block 91; a current sensing block 60; a thermal protection safety block 92; and a signal detection block 61 for detecting a secondary signal.

And, the mobile device 300 includes an IrDA controller 302 and IrDA port, and the like. Accordingly, the data communication is possible between the mobile device 300 and the non-contact charger 1 using each of their IrDA ports.

The mobile device 300 includes a charging battery-pack 200 coupled to the non-contact charger 1 of the present invention as configured thus to transmit/receive data to/from the non-contact charger 1 and wirelessly supplied with an electric power for power supply.

That is to say, the mobile device 300 may be coupled to one side of the charge body 2 of the non-contact charger 1, and it includes a charger body 201 transmitting/receiving a data signal by means of a magnetic field in no contact with the primary coil 70 and having the secondary coil 80 provided in one side thereof and receiving a power signal; a charger controller 210 coupled to the secondary coil 80 in an one inner side of the charger body 201 to process a power signal transmitted from the primary coil 70 and transmit the processed power signal to the rechargeable battery 230 and processing a data signal transmitted/received to/from the primary coil 70; and a charge management block 220 for transmitting a charging electric power to the rechargeable battery 230 through the control of the charger controller 210, wherein the charge management block 220 supplies an electric power of the rechargeable battery 230 to the mobile device 300.

Accordingly, the mobile device 300 includes a unique ID unit (a unique ID chip) for transmitting a unique ID to the non-contact charger 1 through the secondary coil and the primary coil 70 if the charger controller 210 senses the initial connection from the non-contact charger 1; and a charge detector circuit for sensing a charging level of the rechargeable battery 230 to transmit a data signal to the non-contact charger 1.

And, the charger body 201 may be composed of separated packs separately formed to be detachable and attachable from/to the mobile device 300. Also, the charger body 201 may be composed of integrated packs arranged inside a body case of the mobile device 300 to be formed integrally.

Then, the charger body 201 composed of the separated packs further includes a device block 240 for supplying a power source of the rechargeable battery 230 to the mobile device 300 through the control of the charger controller 210.

A configuration of the charger body 201 will be described in detail with reference to FIG. 1 and FIG. 3, as follows. First, the secondary coil 80 of the charging battery-pack 200 is coupled to a full-bridge rectification block 81 of the mobile device. And, the charger controller 210 coupled to the rectification block 81 may transmit a unique ID of the mobile device 300 or the charging battery-pack (a wireless charge-enabled battery pack) 200, sense foreign substance, turn on/off a charging feedback charge circuit, and transmit a charging level to the non-contact charger 1, and it has a signal-to-USB conversion function. And, the charger body 201 may includes a charge management block 220 for charging, a fuel gauge control block 221, a protection control block 222, a PTC and rechargeable battery 230, and a USB controller 301 or an IrDA controller block 302 installed inside the mobile device 300, and the like together.

And, the charging battery-pack 200 is provided with a plurality of safety devices, as in the safety devices of the above-mentioned non-contact charge management block 1.

That is to say, the safety devices of the charging battery-pack 200 feedbacks the distributed voltage because NTC coupled to the outside of the safety devices changes a resistance value according to the change in temperature the presence of a temperature sensor installed inside the charge management block, and therefore the safety devices may function to intercept the charging if the temperature exceeds the previously set temperature. Also, the safety devices of the charging battery-pack 200 protect a battery from overcurrent, overvoltage, overdishcarge, short circuit, etc. using the protection block, so called PCM, and also protect the charging battery-pack 200 the rechargeable battery 230, and their circuits since they are shut down by the overcurrent and temperature using PTC or bimetal. And, the safety devices of the charging battery-pack 200 may include a mechanism that transmits an erroneous signal to the non-contact charger 1 through the load regulation if an erroneous operation in the safety devices is caused for ID chips installed in the charging battery-pack 200 and other many chips during the charging, and then receives a signal from the non-contact charger 1 through FSK and switches the non-contact charger 1 off to suspend a power supply.

And, this charging battery-pack 200 is integrally formed along with the mobile device 300 since it is arranged inside the mobile device 300, as shown in FIG. 5 to FIG. 9, or may be separately formed to facilitate its detachment and attachment. Accordingly, the mobile device 300 may include a power reception device block 310 electrically contacted with the device block 240 of the charging battery-pack 200 to receive an electric power; a DC/DC converter 320 coupled to the power reception device block 310 to convert an electric power; and a charge block 330 for charging the electric power converted in the DC/DC converter 320.

In general, the above-mentioned non-contact transformer according to the present invention has disadvantages that it has a relatively lower self inductance than the conventional transformers since it has large pores unlike the conventional transformers, and that a circulating current flows according to the change in load if the conventional serial resonant converter is used in the non-contact transformer since it has a relatively larger leakage inductance. In addition, the non-contact transformer according to the present invention has a problem that a switching loss may be caused by the continuous current flow in secondary rectifier diodes, depending on the reverse recovery characteristics of the diodes. However, in order to solve the problems, the non-contact transformer according to the present invention has advantages that its circulating current flow may be significantly lower than if the conventional serial resonant converter is used in the non-contact transformer since a LLC full-bridge serial resonator converter 50 for a non-contact transformer may operate at a lower switching frequency than a resonance frequency, and that a switching loss of the diodes may be reduced since a discontinuous current flows in the secondary rectifier diodes.

Also, the primary coil 70 and the secondary coil 80 are composed of any one of FPCB, PCB, coil and ferrite core of the detachable transformer, and formed in a flat or cylindrical shape of a circle, tetragon or polygon to facilitate the signal transmission.

Figure 5:
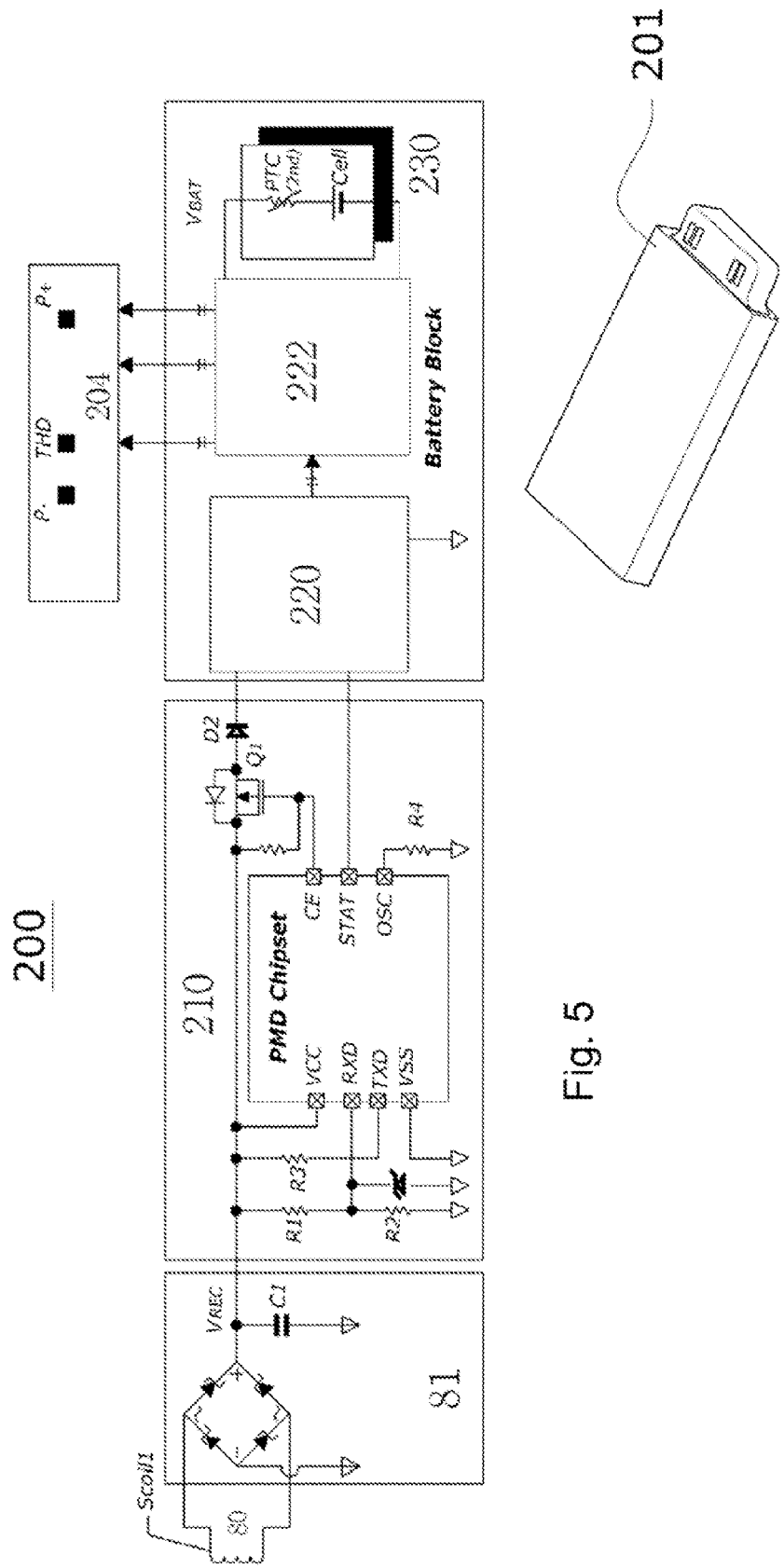
FIG. 5 is a circuit view showing a charging battery-pack according to the present invention.
Figure 6:
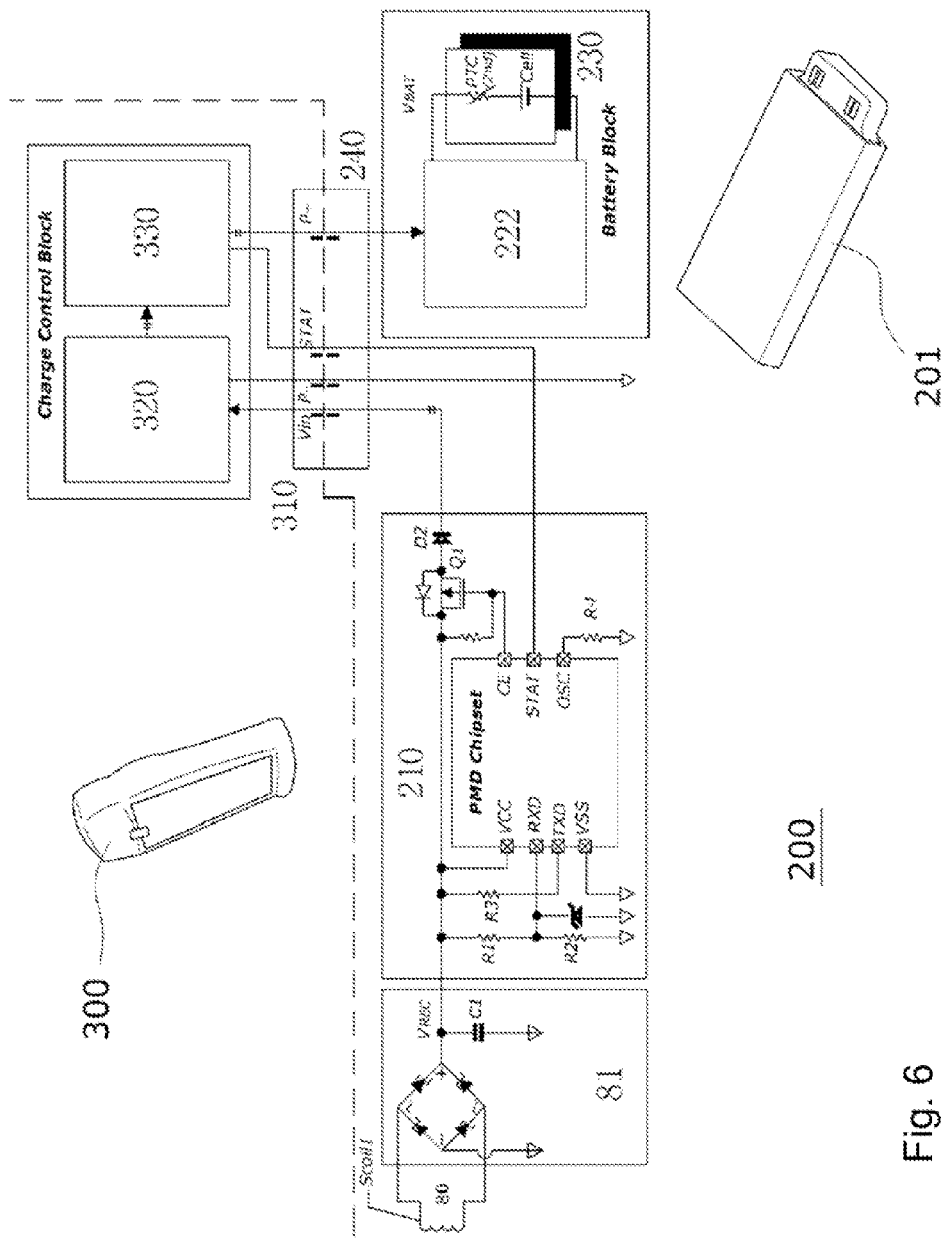
FIG. 6 is a circuit view showing another embodiment of the charging battery-pack according to the present invention.

The preferred production embodiment of the non-contact charging battery-pack 200 according to the present invention will be described with reference to FIG. 5 to FIG. 9, as follows. That is to say, FIG. 5 is a diagram showing a charging battery-pack 200 composed of all-in-one hard packs, and FIG. 6 is a circuit view showing one preferred embodiment of a charging battery-pack installed inside the mobile device 300.

That is to say, the charging battery-pack 200 composed of the all-in-one hard packs includes a secondary coil and a magnetic field shield, a rectification block, a charge management block (a switching or linear charging circuit), a wireless communication ID detection block, a protection block, and a battery. That is to say, the charging battery-pack 200 is composed of a secondary coil (including a coil or core) 80; a rectification block 81; a charger controller 210 which is an adapter control block having a port installed inside, the port being able to enable or disable LDO+ID (TX, RX communication)+an FET drive+a battery charging input (Empty, Full signal) function+an oscillator+a charge management block; a protection control module (PCM) 222; a PTC and a rechargeable battery 230; a charge management block 220; a device block 240 which is a device coupled to a mobile phone, etc.

In the case of the embedded charging battery-pack 200, a case cover of the mobile device 300 has a secondary coil a magnetic field shield (using a method for ejection-molding a coil on a cover, or manufacturing a protective case and subjecting the case to an ultrasonic welding process), and produces a device, which can be coupled to the mobile device 300, to incorporate a rectification block and a wireless ID detection block into the embedded block of the mobile device 300 coupled through the device, and then the charging battery-pack 200 is charged with an electric power through the device coupled of the battery pack installed inside by employing the DC/DC converter 320 and the charge block 330 installed inside the mobile device 300.

Also, still another configuration of the charging battery-pack 200 installed inside the mobile device 300 includes a secondary coil and a magnetic field shield; a rectification block; a wireless communication ID detection block; a protection block; a battery, and the like, all of which are installed inside the case cover of the mobile device 300 without its being melt-adhered to the case cover, and produces the mobile device 300 and a connection device such as a rectification block output, grounding, two battery poles, a charging pin, and then the charging battery-pack 200 is charged with an electric power through the device coupled of the battery by employing the DC/DC converter 320 and the charge block 330 installed inside the mobile device 300.

Blocks for this embedded charging battery-pack 200, which is a non-contact charging semi-inner pack applicable to the mobile device 300, may include a secondary coil (including a coil or core) 80; a rectification block 81; a charger controller 210 which is an adapter control block having a port installed inside, the port being able to enable or disable LDO+ID (TX, RX communication)+an FET drive+a battery charging input (Empty, Full signal) function+an oscillator+a charge management block; a protection control module (PCM) 222; a PTC and a rechargeable battery 230; a DC/DC converter 320 installed inside the mobile device 300 as a GSM mobile phone; and a charge block 330 installed inside the mobile device 300 as a GSM mobile phone, as shown in FIG. 6. At this time, the mobile device 300 as the GSM mobile phone refers to a mobile device (for example, a GSM mobile phone) having a DC/DC converter 320 and a charge block 330 installed in the device.

As a result, if the mobile device 300 as the GSM mobile phone having a non-contact charging semi-inner pack, that is, a charging battery-pack 200 installed inside is mounted on the non-contact charger 1, an electric power is generated in the non-contact charger 1 and transmitted to the charging battery-pack 200 through the secondary coil 80.

Therefore, a secondary side as the charging battery-pack 200 receives AC current from the secondary coil 80 and rectifies the AC current in the rectification block 81 to convert the rectified AC current into DC current, and generates a power save code for reducing an electric power in the non-contact charger 1 and transfers the generated power save code through a TXD pin if its voltage exceeds stable voltage (for example, 5.5 V), and then by adjusting a voltage of the secondary side to the stable voltage (for example, 5.5 V) using a parameter (frequency). This procedure is repeated to generate ID for a stable voltage (for example, 5 V) if a voltage of the secondary side as the charging battery-pack 200 becomes the stable voltage (for example, 5 V) which is an optimum voltage condition, and to generate an electric power in the non-contact charger 1 if the ID of the non-contact charger 1 is matched. If the ID of the non-contact charger 1 is not matched, a power supply is shut down and under a sleep mode in the non-contact charger 1, or an error is caused to shut down a power supply since there in no data reception information for the unique ID when foreign substance is put on the non-contact charger 1.

Figure 7:
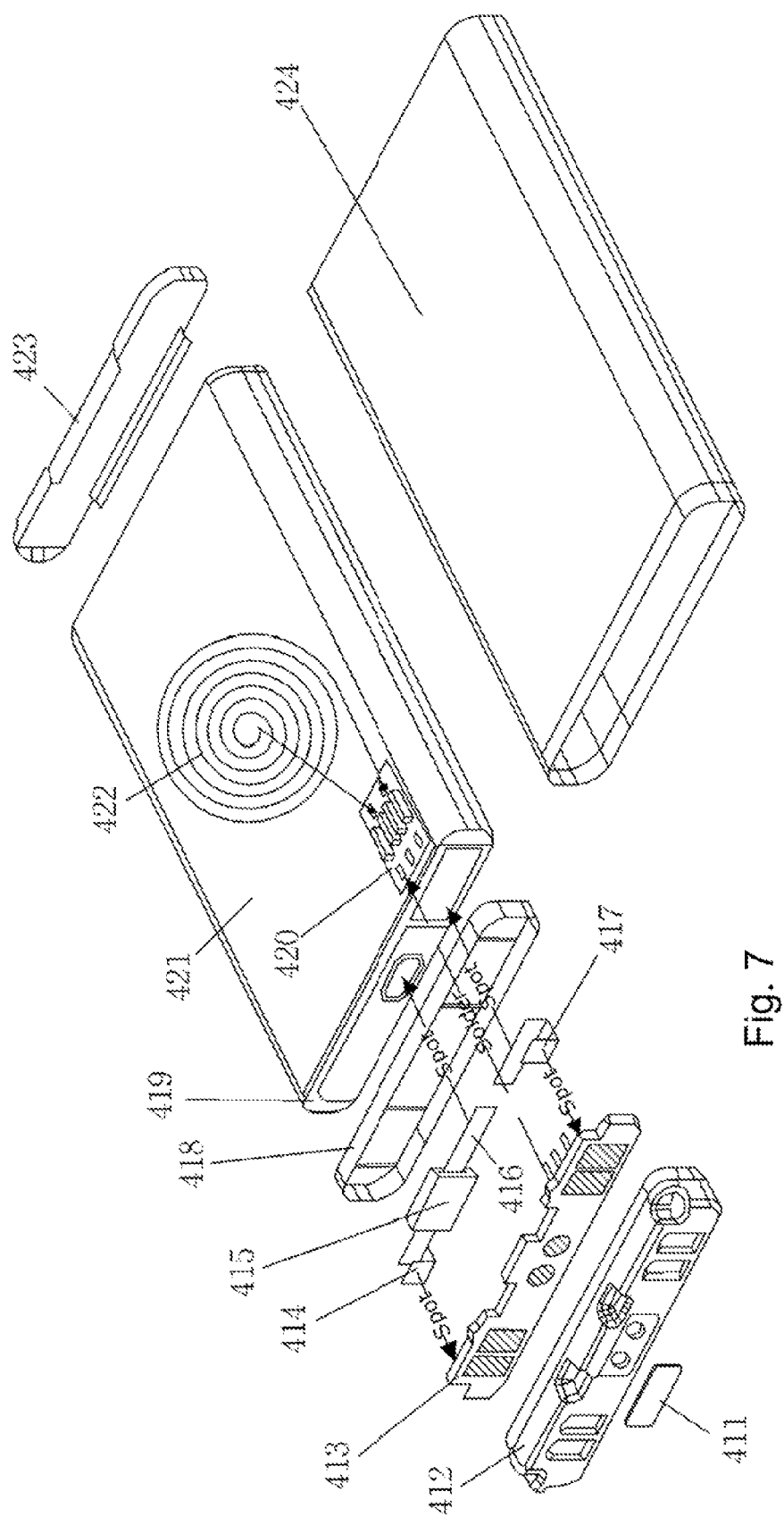
FIG. 7 is an exploded perspective view showing the first embodiment of the charging battery-pack according to the present invention.
Figure 8:
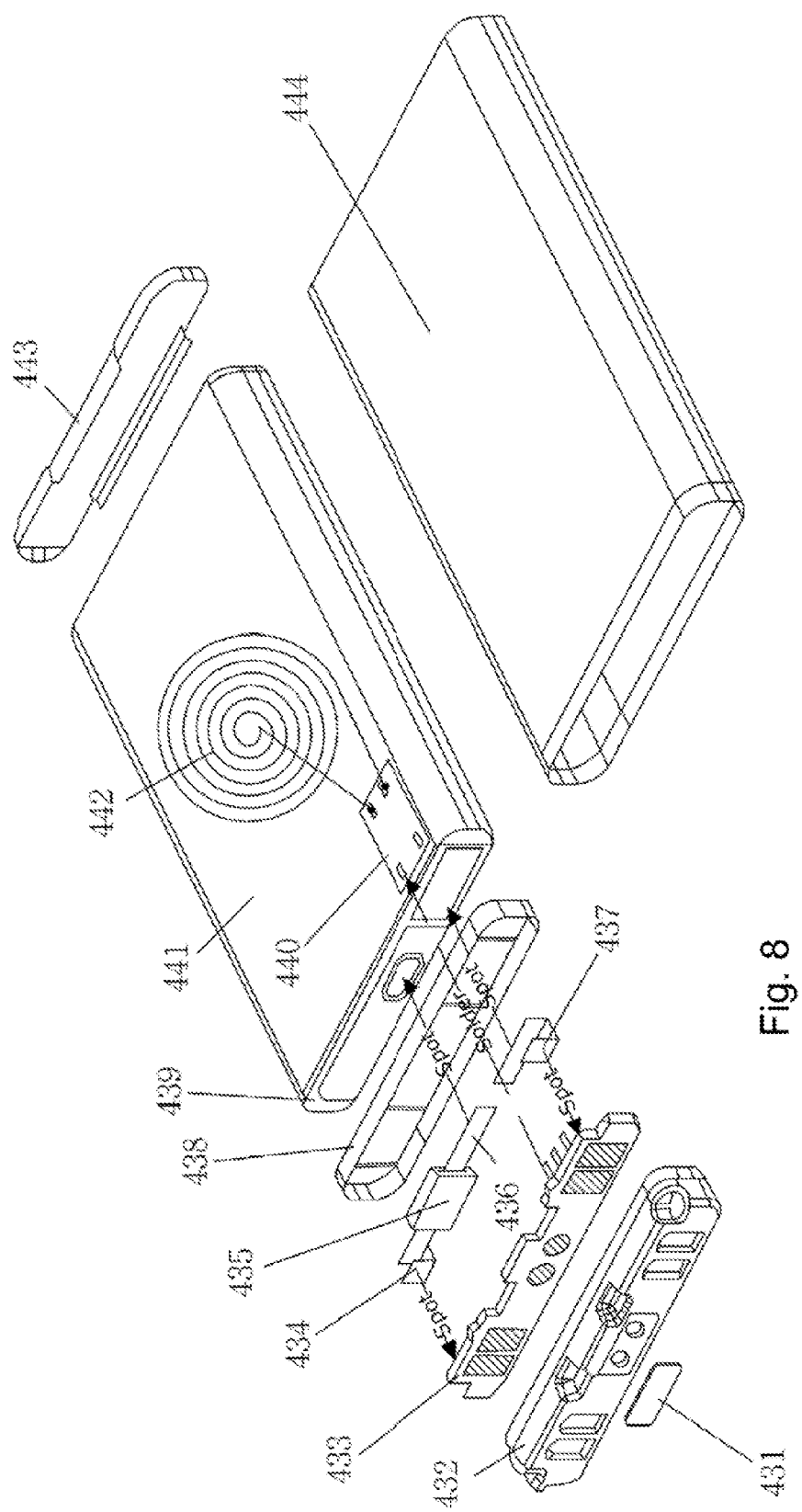
FIG. 8 is an exploded perspective view showing the second embodiment of the charging battery-pack according to the present invention.
Figure 9:
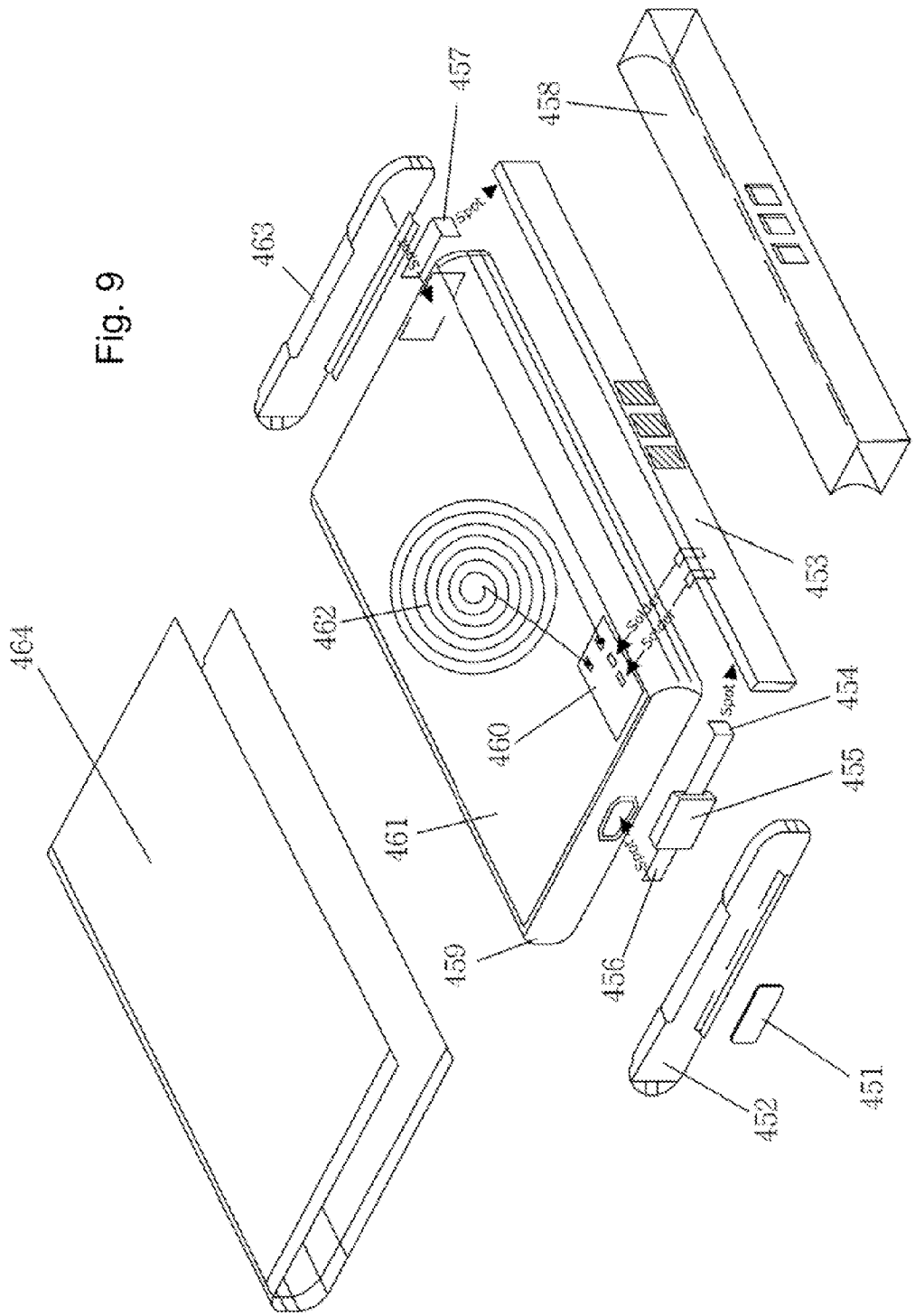
FIG. 9 is an exploded perspective view showing the third embodiment of the charging battery-pack according to the present invention.

FIG. 7 to FIG. 9 show exploded perspective views according to various preferred embodiments of the charging battery-pack 200.

First, referring to a configuration of the charging battery-pack 200 according to the first embodiment as shown in FIG. 7, the charging battery-pack 200 includes an A/S label 411, a top case 412, a non-contact charging PCB board 413, a (−)Ni-plate 414, a PTC or bimetal 415, a lead wire 416, a (+)Ni-plate 417, an auxiliary case 418, a Nomax tape 419, a rectifier board 420, a battery cell 421, a secondary coil 422, a bottom case 423, and a label 424. That is to say, this is one embodiment that the rectifier board 420 is arranged on the top.

Next, FIG. 8 shows an assembly view (top arrangement of a circuit board) of a non-contact charging and internal battery pack according to the second embodiment. Here, the non-contact charging and internal battery pack includes an A/S label 431, a top case 432, a non-contact charging PCB board 433, a (−)Ni-plate 434, a PTC or bimetal 435, a lead wire 436, a (+)Ni-plate 437, an auxiliary case (able to be filled in a hot melt manner) 438, a Nomax tape 439, a connector board 440, a battery cell 441, a secondary coil 442, a bottom case 443, and a label 444.

And, FIG. 9 shows an assembly view (side arrangement of a circuit board) of a non-contact charging and internal battery pack according to the third embodiment. Here, the non-contact charging and internal battery pack includes an A/S label 451, a top case 452, a non-contact charging PCB board 453, a (−)Ni-plate 454, a PTC or bimetal 455, a lead wire 456, a (+)Ni-plate 457, an auxiliary case (able to be filled in a hot melt manner) 458, a Nomax tape 459, a connector board 460, a battery cell 461, a secondary coil 462, a bottom case 463, and a label 464.

Figure 10:
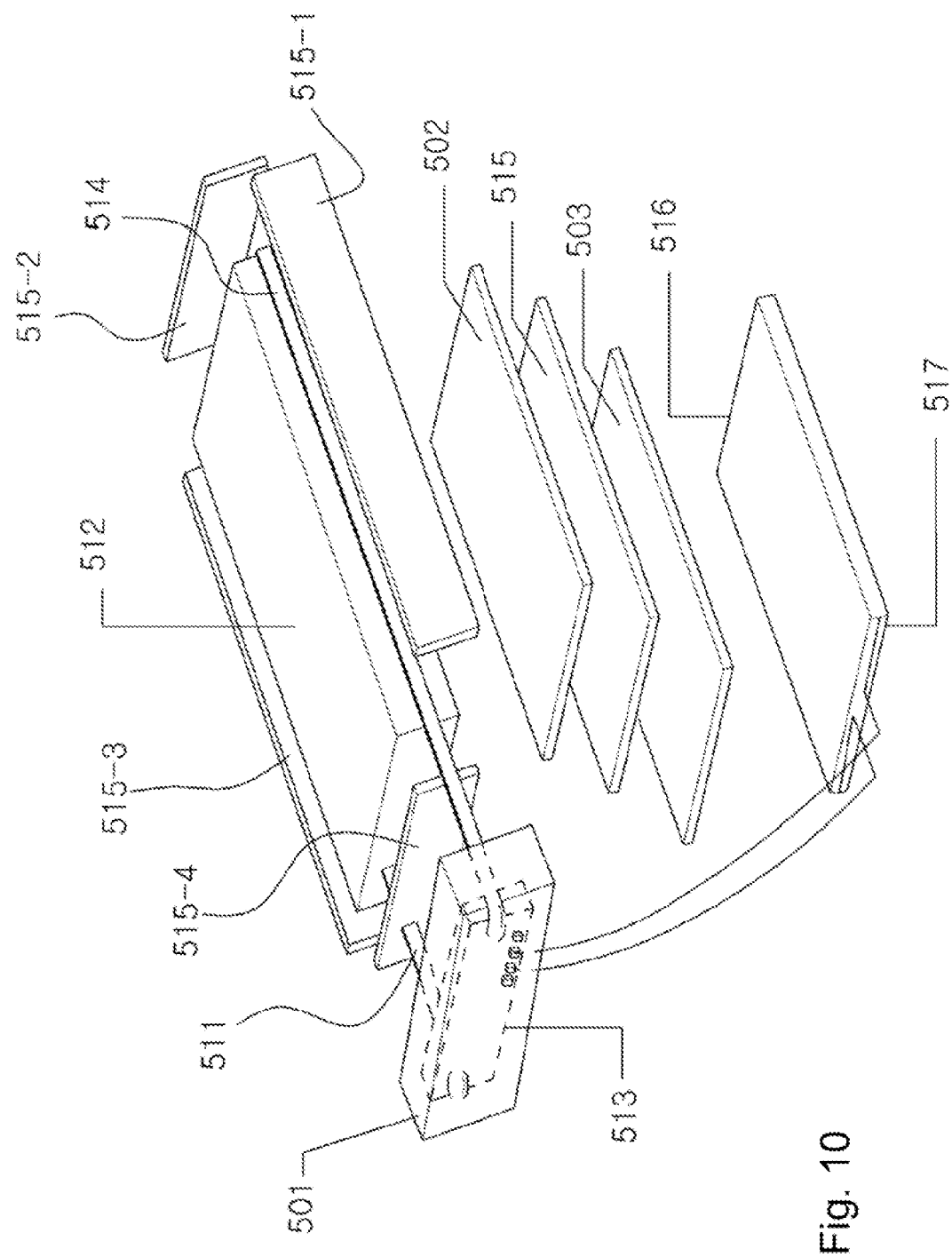
FIG. 10 is an exploded perspective view showing a battery-pack having a wireless power wireless power receiver module among the charging battery-pack according to the present invention.
Figure 11:
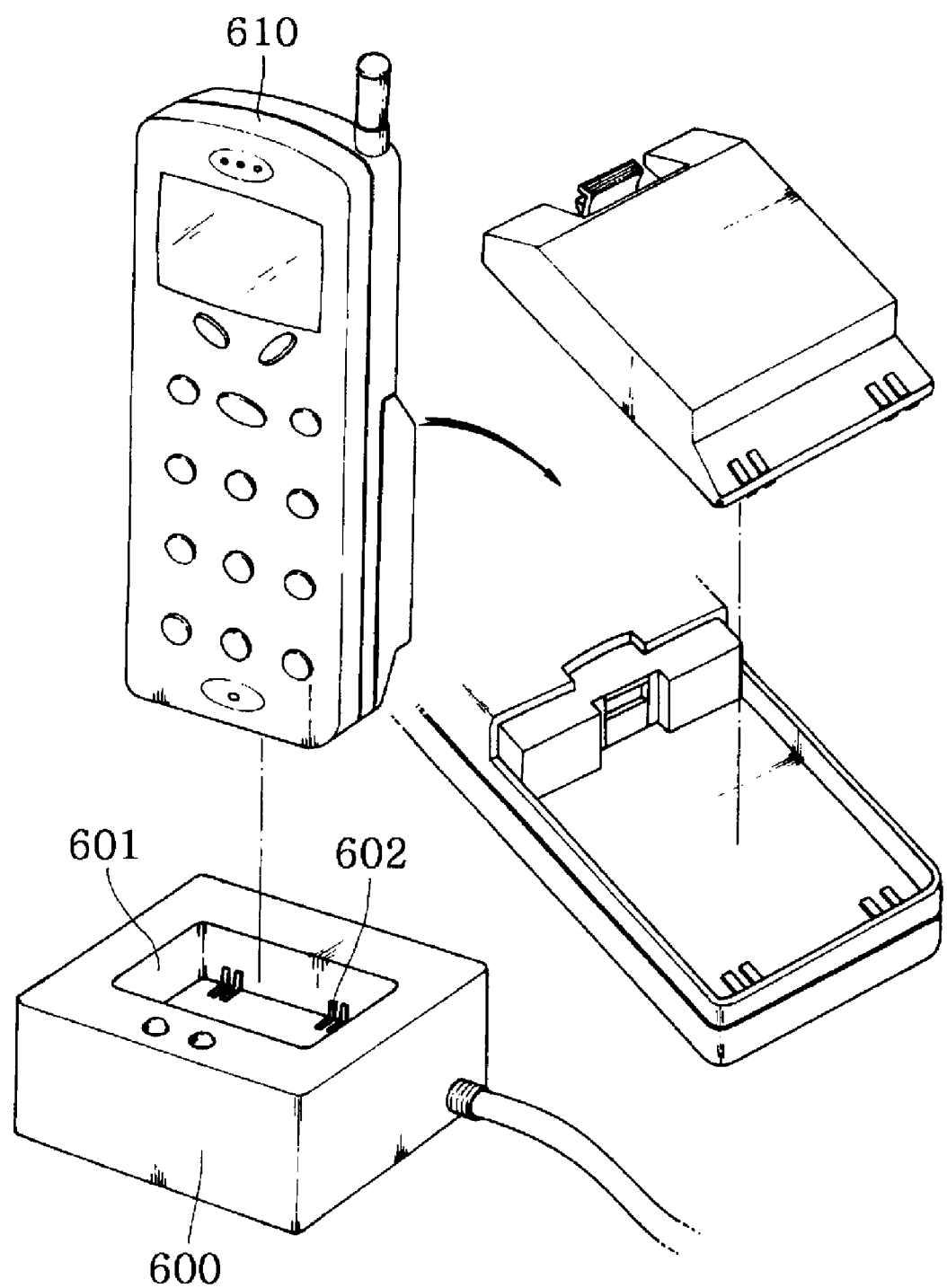
FIG. 11 is a use view showing a charging device for a conventional mobile phone.

The battery pack as configured thus has a shield member for shielding a magnetic field having a schematic structure as shown in FIG. 10. Erroneous operations and overheating in the battery cells and the charging blocks are prevented due to the presence of such a shield member. That is to say, the battery cells 421, 441, 461 as shown in FIG. 7 to FIG. 9 may be configured as in the configuration of the battery cell 512 having the shield member schematically shown in FIG. 10.

That is to say, FIG. 10 is a block diagram showing a charging battery-pack 200 having a wireless power receiver module. Here, the charging battery-pack 200 composed of coils, fine metals, thin aluminum films (foils, etc.), lithium ions or lithium polymers is configured so that a thin aluminum film can be put into the charging battery-pack 200 to completely intercept a magnetic field, and the charging battery-pack 200 can be charged/discharged at about 500 cell cycles without adversely affecting the cells. Here, the coil includes all shapes of coils. That is to say, the coil may be formed in various shapes such as tetragonal, circular or oval shapes, etc. Therefore, the charging battery-pack 200 having a wireless power receiver module may include wireless power receiver circuits arranged in one side of the battery cell 512 in a vertical or horizontal direction; and a shield member 501 for shielding a magnetic field surrounding the wireless power receiver circuits 513.

And, the charging battery-pack 200 composed of coils, fine metals, thin aluminum films (foil, etc.), lithium ions or lithium polymers includes a shield plate 515 for completely shielding a magnetic field. The shield member 501 and the shield plate 515 are formed of thin plates which comprises Al, Cu, Ni Alloy metals, etc. Also, the battery cell 512 has the same configuration as the shield plate 515. Accordingly, the battery cell 512 includes shield plates 515-1, 515-2, 515-3, 515-4, all of which are arranged in the front, rear, left and right sides in the center of the battery cell 512, and therefore it is configured to protect the battery cell 512 from the magnetic field. A magnetic plate 503 is provided between the shield plate 515 and the charge receiver module 517 into which the secondary coil 516 is wound, and therefore it has a magnetic body having a high transmissivity so that the magnetic field induced from the primary coil is easily induced into the secondary coil 516. This magnetic plate 503 is composed of ferrites, Mn—Zn (50 parts by weight:50 parts by weight), or Ni—Fe (80 parts by weight:20 parts by weight), or manufactured by employing Fe as a main component in fine metals (Fe—Si—Cu—Nb), and adding Si and B, and a trace of Cu and Nb at a high temperature and quenching and solidifying the resulting mixture below 100° C.

And, an insulating board 502 as an insulator is provided between the shield plate 515 and the battery cell 512, and particularly the insulating board 502 is composed of meshes composed of NI—Cu; or insulators capable of emitting the heat and decreasing its heat conduction, thereby to prevent the increase in temperature of the battery cell 512 and the overheating of the battery cell 512. Accordingly, the charging battery-pack 200 can be charged/discharged at about 500 cell cycles since it is coupled to the charge receiver module 517 so as to prevent the temperature and the magnetic field from adversely affecting the battery cells 512. At this time, the coils may be formed in all possible shapes. Reference numeral 511 (not shown) represents a (−) device, and Reference numeral 514 (not shown) represents (+) device, and Reference numeral 516 (not shown) represents a coil.

The non-contact charger 1 according to the preferred embodiment of the above-mentioned charging battery-pack 200 also has a primary coil 70 formed on the top surface of the device body 2 having an enclosed shape, and may constitute the primary coils 70 in the form of coils or cores which are formed in spirally circular, tetragonal or polygonal shapes. As described above, if the mobile device 300 having the charging battery-pack 200 or the charging battery-pack 200 arranged inside is put on the non-contact charger 1 composed of the primary coils 70, the mobile device 300 is configured so that it can supply data for transceiver and an electric power for power supply to the computer or notebook computer while it is coupled to the computer or notebook computer.

Although exemplary embodiments of the present invention have been shown and described, it would be appreciated by those skilled in the art that changes might be made in these embodiments without departing from the principles and spirit of the invention, the scope of which is defined in the claims and their equivalents.

The invention claimed is:

1. A non-contact charger comprising:
   a connector configured to connect to a communication port of a computer and configured to receive a power signal and a data signal from the computer when the connector is connected to the communication port;
   a communication driver coupled to the connector and configured to generate an input data based on the data signal received from the computer;
   a converter configured to convert the input data generated by the communication driver to a transmission signal to wirelessly transmit the input data to a target object; and
   a primary coil configured to generate an induced electromotive force based on the transmission signal to wirelessly transmit the input data to the target object along with an input power signal for the target object.

2. The non-contact charger according to claim 1, wherein the input power signal comprises a power source for the target object.

3. The non-contact charger according to claim 1, wherein the connector comprises a USB connector.

4. The non-contact charger according to claim 1, wherein the power signal received from the computer comprises a power source for the non-contact charger.

5. The non-contact charger according to claim 1, wherein the communication driver is configured to convert the data signal received from the computer to an IrDA signal.

6. The non-contact charger according to claim 5, further comprising an IrDA port for transmitting the converted IrDA signal to the target object.

7. The non-contact charger according to claim 1, wherein the target object comprises a mobile device.

8. A non-contact charger comprising:
   a connector configured to connect to a communication port of a computer and configured to receive a power signal and a data signal from the computer when the connector is connected to the communication port;
   a communication driver coupled to the connector and configured to convert the data signal to an IrDA signal;
   an IrDA port for wirelessly transmitting the converted IrDA signal to a target object; and
   a primary coil configured to generate an induced electromotive force based on the power signal and wirelessly transmit the power signal to the target object.

9. The non-contact charger according to claim 8, wherein the connector comprises a USB connector.

10. The non-contact charger according to claim 8, wherein the power signal received from the computer comprises a power source for the non-contact charger.

11. The non-contact charger according to claim 8, wherein the target object comprises a mobile device.

12. A non-contact charger comprising:
    a primary coil configured to generate an electric power signal and transmit the generated electric power signal to an external unit, the primary coil being configured to receive an electromotive force generated by the external unit and generate an inductive current in response to the electromotive force; and
    a current sensor configured to monitor the inductive current generated by the primary coil to obtain identification information of the external unit,
    wherein the current sensor is configured to control the transmission of the generated electric power signal to the external unit based on the identification information.

13. The non-contact charger according to claim 12, wherein the identification information comprises an optimum voltage condition of the external unit.

14. The non-contact charger according to claim 12, wherein the identification information comprises a power saver code for reducing an electric power in the non-contact charger.

15. The non-contact charger according to claim 12, wherein the current sensor is configured to adjust the electric power signal generated in the primary coil based on the identification information.

16. The non-contact charger according to claim 12, wherein the current sensor is configured to adjust a frequency of the electric power signal based on the identification information.

17. The non-contact charger according to claim 12, wherein the current sensor generates PWM pulses having a constant interval in the primary coil.

18. The non-contact charger according to claim 12, wherein the current sensor determines whether the identification information contains a predetermined signal unique to the external unit.

19. The non-contact charger according to claim 18, wherein, when the current sensor determines that the identification information contains the predetermined signal, the primary coil wirelessly transmits the electric power signal to the external unit.

20. The non-contact charger according to claim 18, wherein, when the current sensor determines that the identification information does not contain the predetermined signal or fails to receive the identification information, the primary coil disables transmission of the electric power signal to the external unit.

21. A battery pack comprising:
a rechargeable battery cell;
a charger body comprising an induction coil and configured to receive a power signal through a magnetic field induced by the induction coil;
a charger controller coupled to the induction coil to process the power signal and transmit the processed power signal to the battery cell; and
a shielding member disposed between a surface of the battery cell and the induction coil,
wherein the shielding member comprises a board in the form of a mesh comprising Ni—Cu compound.

22. The battery pack according to claim 21, wherein the shielding member further comprises a plate made of a metal alloy comprising Al, Cu, and Ni.

23. The battery pack according to claim 21, wherein the shielding member insulates the battery cell from the induction coil.

24. A method for wirelessly charging an object comprising:
connecting a non-contact charger to a communication port of a computer and receiving a power signal and a data signal from the computer;
generating an input data based on the data signal received from the computer;
converting the generated input data to a transmission signal to wirelessly transmit the input data to a target object; and
generating an induced electromotive force in an induction coil based on the transmission signal to wirelessly transmit the input data to the target object along with an input power signal for the target object.

25. The method according to claim 24, wherein the input power signal comprises a power source for the target object.

26. The method according to claim 24, wherein connecting the non-contact charger to the communication port comprises connecting through a USB connector.

27. The method according to claim 24, wherein the power signal comprises a power source for the non-contact charger.

28. The method according to claim 27, further comprising converting the data signal received from the computer to an IrDA signal and transmitting the IrDA signal to the target object.

29. A method for wirelessly charging an object comprising:
connecting a non-contact charger to a communication port of a computer and receiving a power signal and a data signal from the computer;
generating an induced electromotive force in an induction coil based on the power signal and wirelessly transmit the power signal to a target object;
converting the data signal to an IrDA signal; and
wirelessly transmitting the converted IrDA signal to the target object.

30. The method according to claim 29, wherein connecting the non-contact charger to the communication port comprises connecting through a USB connector.

31. The method according to claim 29, wherein the power signal comprises a power source for the non-contact charger.

32. A method for wirelessly charging an external unit, comprising:
generating an electric power signal in a primary coil and transmitting the generated electric power signal to an external unit;
receiving an electromotive force generated by the external unit;
generating an inductive current in the primary coil in response to the electromotive force;
monitoring the inductive current in the primary coil to obtain identification information of the external unit; and
controlling the transmission of the generated electric power signal from the primary coil to the external unit based on the identification information.

33. The method according to claim 32, wherein the identification information comprises an optimum voltage condition of the external unit.

34. The method according to claim 32, wherein the identification information comprises a power saver code for reducing an electric power in the non-contact charger.

35. The method according to claim 32, wherein controlling the transmission of the generated electric power signal comprises adjusting the electric power signal generated in the primary coil based on the identification information.

36. The method according to claim 35, wherein adjusting the electric power signal comprises adjusting a frequency of the electric power signal based on the identification information.

37. The method according to claim 32, wherein controlling the transmission of the generated electric power signal comprises generating PWM pulses having a constant interval in the primary coil.

38. The method according to claim 32, further comprising determining whether the identification information contains a predetermined signal unique to the external unit.

39. The method according to claim 38, further comprising disabling the transmission of the electric power signal to the external unit if the current sensor determines that the identification information does not contain the predetermined signal or fails to receive the identification information.

40. A method of shielding a battery cell in a battery pack, wherein the battery pack comprises a rechargeable battery cell and an induction coil configured to receive a power signal through a magnetic field induced by the induction coil, the method comprising:
shielding a surface of the battery cell from the induction coil by providing a shielding member disposed between the surface of the battery cell and the induction coil,
wherein the shielding member comprises a board in the form of a mesh comprising Ni—Cu compound.

41. The method according to claim 40, wherein the shielding member further comprises a plate made of a metal alloy comprising Al, Cu, and Ni.

42. The method according to claim 40, wherein the shielding member insulates the battery cell from the induction coil.

* * * * *